Patented Dec. 6, 1927.

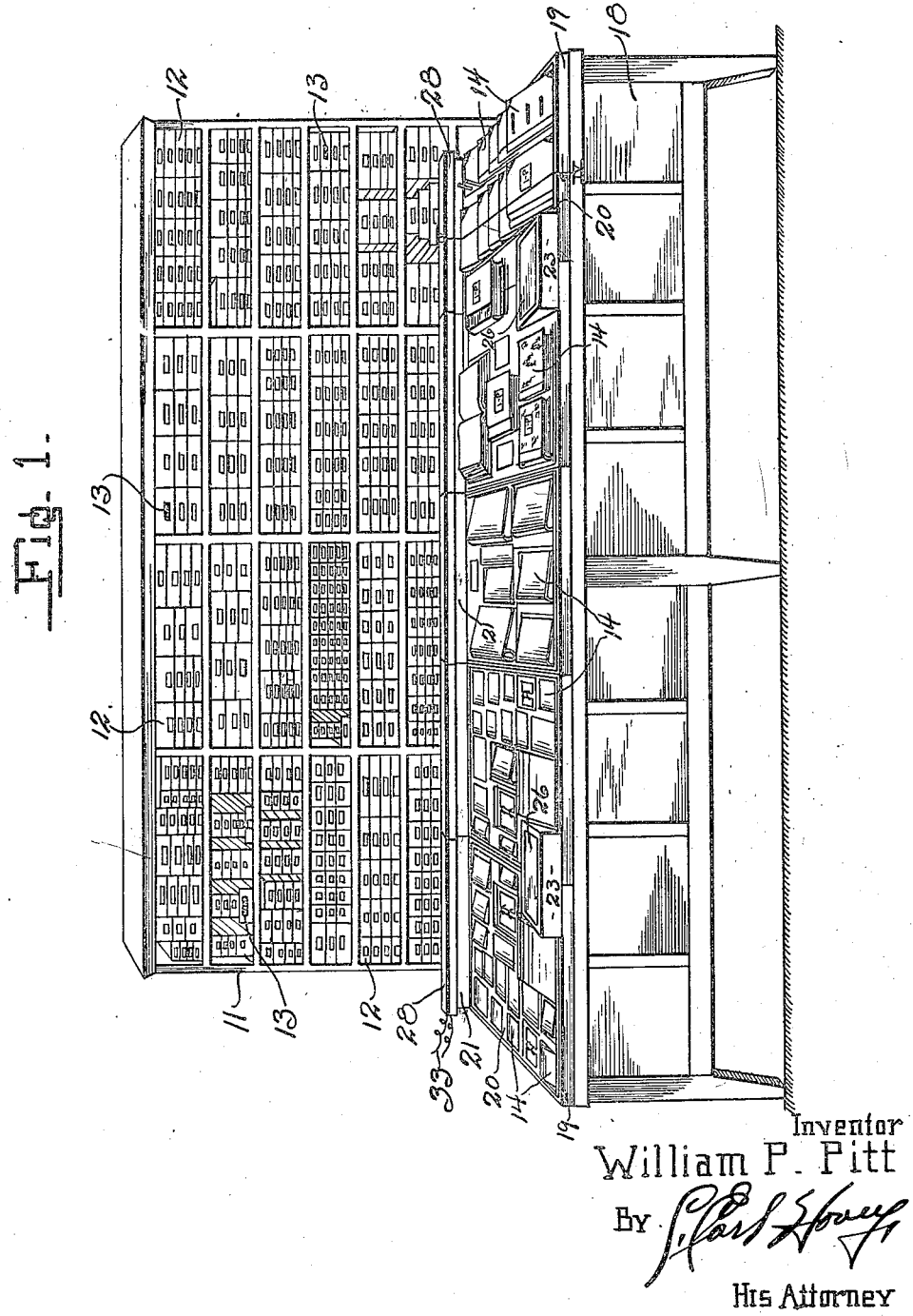

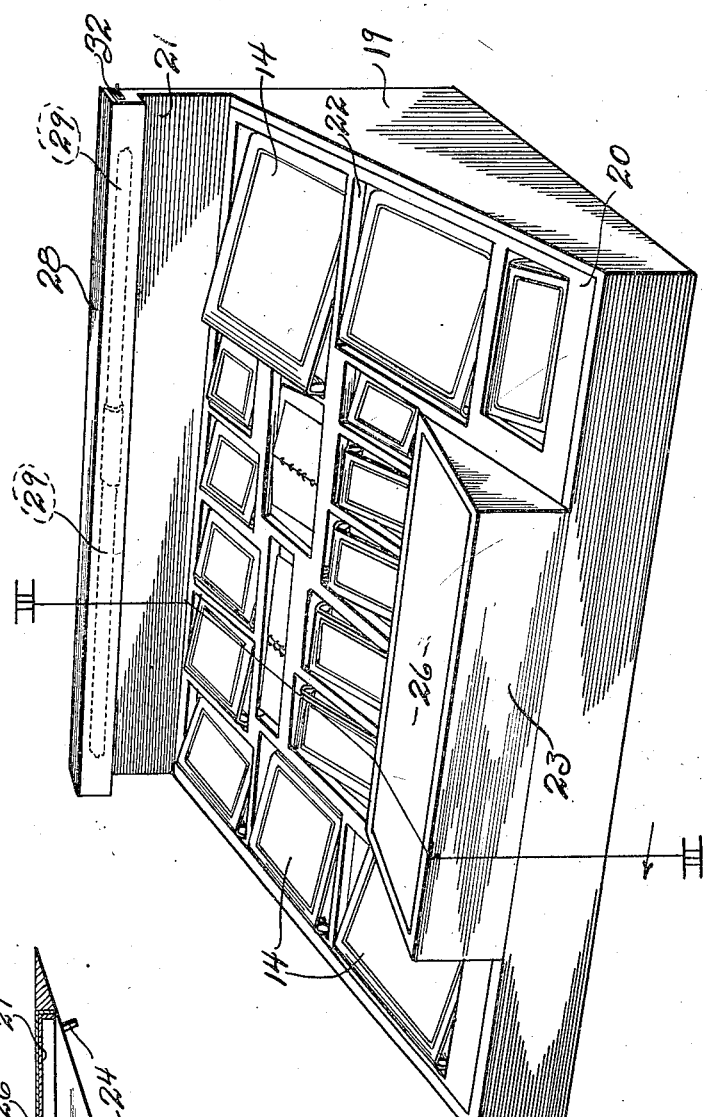

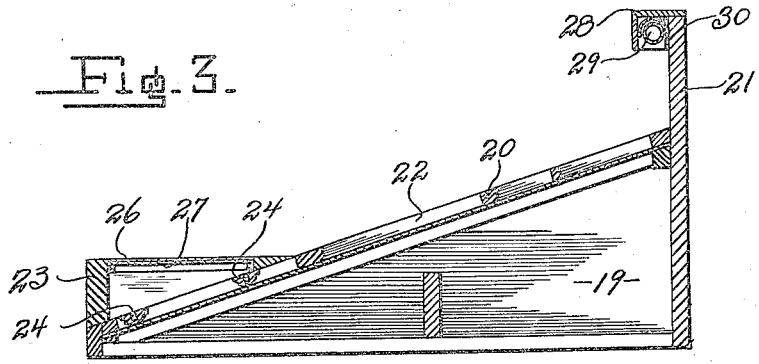
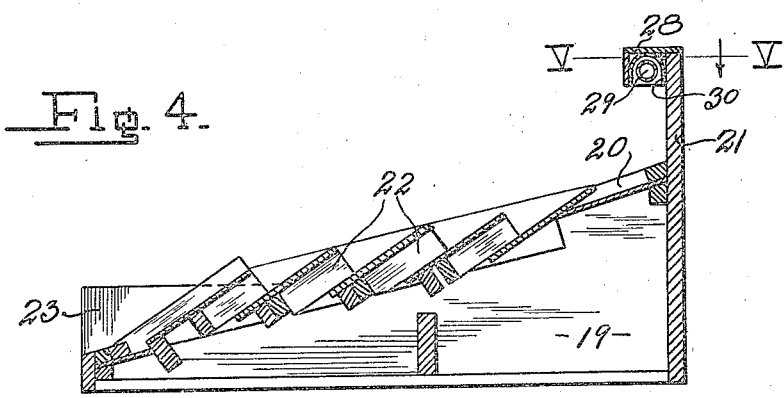
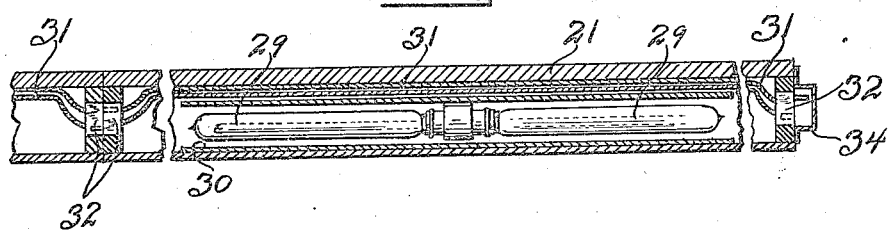
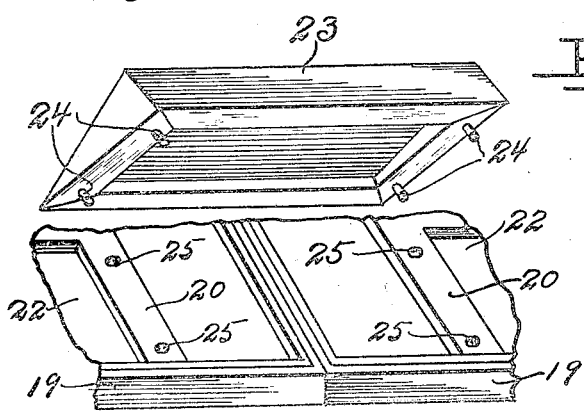

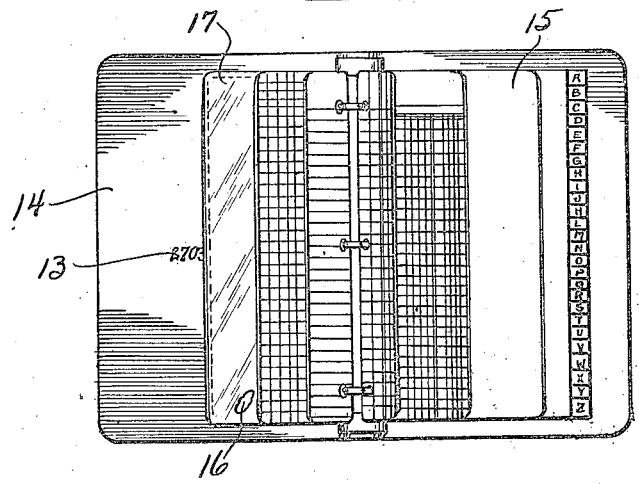
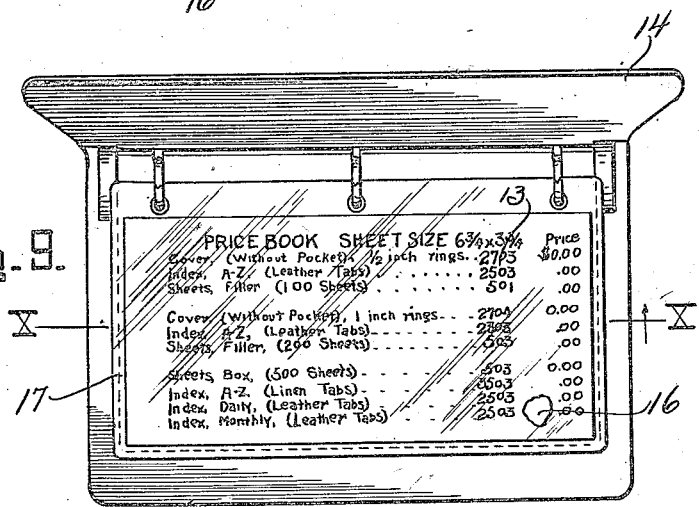

1,651,905

UNITED STATES PATENT OFFICE.

WILLIAM P. PITT, OF KANSAS CITY, MISSOURI, ASSIGNOR TO IRVING-PITT MANUFACTURING COMPANY, OF KANSAS CITY, MISSOURI, A CORPORATION.

MEANS FOR DISPLAYING AND SELLING MERCHANDISE.

Application filed March 12, 1924. Serial No. 698,761.

This invention has for its object the provision of means for displaying or selling merchandise, and the fundamental purpose is to provide desirable ways for facilitating the selection of an article which, when complete, is of the desired size, and includes component parts of chosen quality and quantity.

In general, the invention consists of novel display cases having trays adapted to appropriately present to a customer the merchandise in all its various possible combinations and sizes, each sample having associated therewith and attached thereto a data and price sheet, which also may describe additional parts procurable for that particular piece of goods.

More particularly, this invention applies to the selling of loose-leaf books and forms, and especially to the retailing of such merchandise which permits the customer to select various fillers, forms or parts for a particular size and kind of binder, or other basic commodity capable of being useful through the assembling of any number of different pieces, according to the desire and requirements of the purchaser.

The invention further contemplates obviating the undesirable features of selling loose-leaf books and merchandise having similar characteristics, which is recognized as well known to consist of the taking from stock a large number of binders, oftentimes breaking open a sealed package of printed forms, consuming time in showing goods that are unsuited for the customer's needs and the additional consumption of a clerk's time in returning said binders and forms to the shelves. Through the use of display cases such as form a part of this invention, containing samples having a data and price sheet, the customer may recognize at a glance the book and filler best adapted for his requirements, indicate such sample to the clerk who then notes the number and immediately procures the binder or filler from stock and completes the transaction.

This invention has a still further advantage in that the display cases are constructed in units having removable and interchangeable trays and novel built-in illuminating means with connectors whereby the display capacity of a small store may be increased and the samples re-arranged with a minimum amount of trouble.

With these general objects in view, as well as minor objects which will appear in the course of the detailed specification, the invention will now be described with reference to the accompanying drawings, illustrating a construction in connection with which the invention may be defined, but to which it must not be strictly limited, the right being reserved to make all such formal changes or modifications as may fairly fall within the scope of the appended claims.

In the drawings:—

Figure 1 is a view of a battery of display cases showing the stock shelves of a store located near by.

Fig. 2 is an enlarged perspective view of one of the display cases showing the different size binders in place on the tray.

Fig. 3 is a vertical section of a display case, taken along line III—III of Fig. 2, showing one form of tray in place with a pulpit mounted thereon.

Fig. 4 is a similar vertical section of a display case taken along line IV—IV of Fig. 1, illustrating another form of tray construction.

Fig. 5 is an enlarged fragmentary, horizontal section of the lighting means, taken on line V—V of Fig. 4.

Fig. 6 is a perspective view of a portion of two display cases and trays illustrating the means of connecting said trays by the use of a pulpit.

Fig. 7 is a vertical central section of the pulpit, showing its novel construction.

Fig. 8 is a plan view of one of the sample books, opened to show the various kinds of fillers procurable for that particular book.

Fig. 9 is a similar view showing the price and data sheet; and,

Fig. 10 is a section of said price and data sheet taken along line X—X of Fig. 9, showing the means of visibly protecting the same.

Referring to the drawings in detail, there is illustrated a section of shelving 11 which may be located in any part of a store room, not here shown, but is preferably placed near the accessible display of samples of the particular goods that are kept thereon in boxes or other containers 12, labelled or marked as at 13 with indicia corresponding to that carried by the principal commodity sample 14. The principal commodity in this case are loose-leaf covers or binders 14 each capable of use with many different kinds of leaves or fillers 15 according to the nature of the binder. To facilitate selection, and prevent the consumption of a large amount of time of both store clerk and customer, there may be kept within said principal commodity 14 a sample of each style or kind of procurable part or filler 15. These sample fillers may include different rulings, forms, indexes on various qualities of paper, all of which enable a customer to quickly select the desired merchandise (see Fig. 8).

By this accessible displaying of stock, a complete demonstration of the many kinds of loose-leaf binders, fillers and specialties may be made without tearing down a large number of boxes, breaking open packages of bound leaves and forms and, undoubtedly, having to replace most of it after a customer makes the selection and purchase.

A data and price sheet 16 may be removably associated with the samples of procurable parts or fillers 15, which has additional information regarding such fillers and the binder to which it is attached. This data may include price, number and descriptive matter as illustrated in Fig. 9, and to prevent their being mutilated, unauthorizedly changed and soiled, the data and price sheet 16 is incased in a transparent envelope 17.

To accessibly present to view the binders 4 in an attractive and size comparing relation, a novel display case, which forms a part of this invention, is constructed to be placed upon a counter or other supporting means 18. This support 18 is usually one of the ordinary flat top counters of a store and does not necessarily constitute a portion or part of this invention, the disclosure being sufficient for explanation.

The display case comprises a base 19 with a removable tray 20 disposed in an inclined position with its highest side to the rear or adjacent an upwardly extending back 21 of base 19. Tray 20 may be constructed to provide a series of cavities or recesses 22 for the holding of samples 14 in grouped or size comparing relation, as shown in Figs. 1 and 2, and in practice, it is preferred to have one unit or complete display case contain goods of a single type or kind such as illustrated in Fig. 1, which shows the case at the extreme left holding what are commonly known as "memo books," the next having "price books," the third, "ring binders," fourth, "ledgers" and the one on the right containing "post binders."

Through the use of this method of arrangement and construction, it is obvious that a retail store may start with but one or two display cases showing only that particular line of goods carried in stock, and then, from time to time, add more cases for the revealing of additional merchandise. The trays being of uniform size, may be interchanged at will, or if necessary other trays substituted without moving or disturbing in any way the base.

With reference at this time to the platform or pulpit 23 which may be removably mounted upon trays 20 either centrally thereof (Fig. 2) or in a connecting relation as shown in Figures 1 and 6. Such may be secured by dowel pins 24 adapted to register with and enter sockets 25 of trays 20 and is constructed with an inclined base corresponding to the angle of inclination of tray 20. Thus a perfectly horizontal face is presented which may be used by the customer during his perusal of the samples, or furnished with a covering 26 stretched over and held in place by a closely fitted frame 27 (Fig. 7). Advertising or explanatory matter may be printed or embossed upon cover 26 if desired.

A new and appropriate indirect lighting means formed integrally with base 19 illuminates the face of pulpit 23, samples arranged in tray 20 as well as the front face of upwardly extending back 21 of base 19, which is also provided with advertising or other matter descriptive of the goods contained in the underlying tray. This means comprises a housing 28 supported above tray 20 by upwardly extending back 21 of base 19, and having its lower side open to permit the passage of light rays from electric lamps 29 placed within said housing 28 with convexo-concave reflectors 30 in juxtaposition.

The nature of the goods displayed in these cases requires a close light which will permit proper selection of the many different fillers adapted to be used in the binders. Forms and sheet rulings of various sizes must be closely inspected by the purchaser and, the locating of these lamps, with this point particularly in view, to the rear of the tray where all space adapted to carry advertising may also be constantly illuminated, produces results necessary to the successful employment of these display cases for selling merchandise by this method.

Housing 28 extends the entire length of base 19 and further conceals wires or other electrical conducting means 31 which terminate in "pin and socket" plugs 32 at each end of housing 28. When the occasion arises to add display cases, these plugs 32 register and carry the required current on to the lights 29 of the added base. It is only necessary to attach wires 33 to the store lighting system in order to obtain electricity for any number of dispaly cases; the adding or removing does not require skill. A suitable housing 34 protects the end or un-used plug (Fig. 5).

What is claimed is:

1. In a means for displaying merchandise of the class described, comprising, in combination, a plurality of tray supporting bases, trays each adapted to display merchandise of a kind in size comparing relation carried by said bases, tray illuminating means supported by the upwardly extending back of said base, coupling means for adjoining bases comprising a pulpit having an inclined base and horizontal face, dowel pins in said base adapted to enter sockets therefor formed within said trays whereby said adjoining bases are retained in abutting relation.

2. A display case comprising in combination a base having inclined sides and an inclined tray portion to provide a greater depth at the rear of said base, a pulpit having its bottom inclined corresponding to the angle of inclination of said tray, said pulpit having a horizontal top to provide a level working face and removably mounted on the forward portion of said tray.

3. A display case comprising in combination a base having inclined sides and an inclined removable tray portion, a pulpit comprising a frame and a bottom inclined corresponding to the angle of inclination of said tray, said pulpit having a horizontal top and removably mounted on the forward portion of said tray, and means fitting within said pulpit frame for supporting an advertising cover.

4. A display case comprising in combination a base having inclined sides and an inclined tray portion, a pulpit comprising a frame and having side portions inclined corresponding to the angle of inclination of said tray, said pulpit having a horizontal top and removably mounted on the forward portion of said tray and a removable cover for said top, and means on said cover for supporting advertising matter.

5. A display case comprising a plurality of base portions, removable trays in said bases and adapted to support merchandise, coupling means for detachably coupling adjoining bases comprising a pulpit, said pulpit having a horizontal top and a base, and means on said pulpit base for detachably engaging adjacent trays whereby said adjoining base portions are retained in abutting position.

6. In a display case having an upstanding back member which terminates in an inverted light reflecting housing, in combination, a base having inclined sides and an inclined top, removable trays supported within said inclined top, a pulpit having a horizontal top, side members for said pulpit having an inclination similar to the inclination of the sides of said base, said pulpit being detachably mounted on the forward portion of said trays.

7. In a display case for samples having a support and means thereon for reflecting light downwardly upon said samples, in combination, a tray for holding said samples, a base having inclined sides for supporting said tray in an inclined position, a pulpit having a horizontal working face and inclined sides detachably supported on said inclined tray.

8. In a sectional display case provided with electric lamps and circuits detachably connected thereto, in combination, a plurality of detachable bases, sample holding trays supported on said bases in a position inclined forwardly and downwardly, a pulpit having a horizontal working top and an inclined base portion detachably supported on adjacent trays, and interengaging means on said pulpit and on said trays for retaining said bases in an abutting relation.

9. In a display case in combination, a plurality of bases having inclined sides, a sample holding tray removably supported in an inclined position on the forward portion of each of said bases, a pulpit having a horizontal working top supported on adjacent trays, sockets in said trays and dowel pins on said pulpit for engaging said sockets to retain adjacent bases in an abutting relation.

In testimony whereof I hereunto affix my hand this 10th day of March, 1924.

WILLIAM P. PITT.